United States Patent
Han (10) Patent No.: US 9,906,289 B2
(45) Date of Patent: Feb. 27, 2018

(54) MULTI-UTP FEMTO DISTRIBUTION/RELAY DEVICE AND METHOD

(71) Applicant: CONTELA, INC.

(72) Inventor: Min Soo Han, Bucheon-si (KR)

(73) Assignee: CONTELA, INC., Seongnam-si (KR)

( * ) Notice: Subject to any disclaimer, the term of this patent is extended or adjusted under 35 U.S.C. 154(b) by 18 days.

(21) Appl. No.: 14/901,577

(22) PCT Filed: Aug. 16, 2013

(86) PCT No.: PCT/KR2013/007365
§ 371 (c)(1),
(2) Date: Dec. 28, 2015

(87) PCT Pub. No.: WO2015/002342
PCT Pub. Date: Jan. 8, 2015

(65) Prior Publication Data
US 2016/0218793 A1 Jul. 28, 2016

(30) Foreign Application Priority Data
Jul. 3, 2013 (KR) .......................... 10-2013-0077504

(51) Int. Cl.
H04B 7/155 (2006.01)
H04B 3/36 (2006.01)

(52) U.S. Cl.
CPC .............. *H04B 7/155* (2013.01); *H04B 3/36* (2013.01)

(58) Field of Classification Search
None
See application file for complete search history.

(56) References Cited

U.S. PATENT DOCUMENTS

| | | | | |
|---|---|---|---|---|
| 2002/0039211 A1* | 4/2002 | Shen | ...................... | B82Y 15/00 398/9 |
| 2009/0279456 A1* | 11/2009 | Lee | ...................... | H04B 7/2606 370/279 |
| 2010/0113067 A1* | 5/2010 | Fullam | .................. | H04W 4/021 455/456.3 |
| 2012/0263099 A1* | 10/2012 | Lee | ..................... | H04W 88/085 370/315 |

FOREIGN PATENT DOCUMENTS

| KR | 10-2009-0117074 A | 11/2009 |
|---|---|---|
| KR | 10-0950342 B1 | 3/2010 |
| KR | 10-2010-0068688 A | 6/2010 |
| KR | 10-2010-0118405 A | 11/2010 |
| KR | 10-2012-0104284 A | 9/2012 |
| KR | 10-2013-0004964 A | 1/2013 |

OTHER PUBLICATIONS

International Search Report dated Mar. 19, 2014, issued to International Application No. PCT/KR2013/007365.

\* cited by examiner

*Primary Examiner* — Yemane Mesfin
*Assistant Examiner* — Peter Chen
(74) *Attorney, Agent, or Firm* — Stein IP, LLC (57) ABSTRACT

The present invention relates to distributing and relaying a signal from two or more femtocells to several antennas by using a UTP line. That is, the present invention relates to a dual-band UTP femto distribution/relay device for combining two or more femtocells into a single signal, transmitting the signal through a UTP cable and wirelessly transmitting and receiving the signal remotely with a terminal.

11 Claims, 7 Drawing Sheets

MULTI-UTP FEMTO DISTRIBUTION/RELAY DEVICE AND METHOD

CROSS-REFERENCE TO RELATED APPLICATIONS

This application is a national stage of PCT/KR2013/007365, filed Aug. 16, 2013, which claims the benefit of priority to Korean Application No. 10-2013-0077504, filed Jul. 3, 2013, in the Korean Intellectual Property Office, the disclosures of which are incorporated herein by reference.

TECHNICAL FIELD

The present invention relates to a multi-UTP femto distribution/relay device and method, and more particularly, to distributing and relaying a signal for two or more femtocell signals to several antennas by using an Unshielded Twist Pair (UTP) line. For example, the present invention relates to a multi-UTP femto distribution/relay device and method that combines two or more femtocells into a single signal, transmits the signal to the UTP cable and wirelessly transmits and receives the signal with a terminal remotely.

BACKGROUND ART

A relay device is a device that is located between a base station and a terminal to receive and amplify signals from the base station and the terminal. That is, it refers to a device that receives and amplifies a signal from the base station to transmit the amplified signal to the terminal, and receives and amplifies a signal from the terminal to transmit the amplified signal to the base station. The relay device is installed in the place where a wireless transmission and reception condition between the terminal and the base station is bad, to relay a signal and is mostly installed under or in the building where it is difficult for a signal from the base station to arrive at. The structure of the relay device varies depending on a building structure or the characteristic of a shadow area, and when especially used in the building, a distribution/relay device which uses several distributed antennas is used.

The distribution/relay device may match and relay an outdoor base station outside the building or match and use a base station for only the distribution/relay device, according to the capacity of a user connected to the distribution/relay device. In the case of Long Term Evolution (LTE), each building matches and uses a small base station, i.e., femtocell because the capacity of data occupied by a user is large.

The distribution/relay device is connected to several distributed antennas by using a coaxial cable. The coaxial cable has a characteristic that it is possible to transmit a high-frequency signal used in a base station without a change in frequency as it is. However, since installing the coaxial cable inside the building costs high, a distribution/relay device that uses an UTP line, one of LAN cables has been studied.

As an example, Korean Patent Publication No. 2010-0068688 employs a method that includes converting a high-frequency signal received from a base station or communication device by a wired or wireless connection into a digital signal, and transmitting, by a digital signal processing unit, the digital signal to an Ethernet cable by using time division multiplexing. The technique connects a signal distribution device to a plurality of remote signal transmission and reception devices by an UTP line, a cheap communication cable that has been previously installed without installing a separate cable and relates to a relay device that may transmit an existing Internet signal and a mobile communication signal through the UTP cable simultaneously.

However, it is still difficult to transmit two or more femtocells to the UTP cable due to the limit of a data transmission capacity of an UTP transmission line. Thus, there is a need for a study on transmitting two or more femtocell signals to a single UTP line.

DISCLOSURE OF THE INVENTION

Technical Problem

Exemplary embodiments of the present invention provide a multi-UTP femto distribution/relay device that combines two or more femtocells into a single signal, transmits the signal to the UTP cable and wirelessly transmits and receives the signal with a terminal remotely.

Also, exemplary embodiments of the present invention also provide a multi-UTP femto distribution/relay device that transmits two or more LTE multiple input multiple outputs (LTE MIMO) at a transmission speed lower than or equal to 1 Gbps without an impact on LTE communication quality by using an UTP line.

Technical Solution

Embodiments of the present invention provide a multi-UTP femto distribution/relay device including a signal distribution device matching two or more femtocell transmission signals, converting the signals to a low speed, distributing the converted signals into a single UTP line, reversely converting the signal received from the UTP cable to a high speed, dividing into two or more femtocells, and matching signals; and a remote signal transmission/reception device connected to the signal distribution device through the UTP line, reversely converting the signal received from the UTP cable to a high speed, wirelessly connecting to a terminal, wirelessly connecting to a terminal transmission signal, converting the signal to a low speed, and then matching with a single UTP line.

In one embodiment, the UTP cable may have a maximum transmission speed that does not exceed 1 Gbps.

Other embodiments of the present invention provide a signal distribution device including a signal distribution device control unit monitoring and controlling a state of a signal distribution device; a first transmission signal matching unit matching a transmission signal from a first femtocell to convert a data transmission speed to a low speed; a second transmission signal matching unit matching a transmission signal from a second femtocell to convert a data transmission speed to a low speed; a first framer combining an output from the first transmission signal matching unit, an output from the second transmission signal matching unit, and an output from the signal distribution device, into a single signal to transmit the single signal to a remote signal transmission/reception device; a first deframer receiving and deframing a terminal signal from the remote signal transmission/reception device to transmit data to the first reception signal matching unit, to the second reception signal matching unit, and to the signal distribution device control unit; a first reception signal matching unit converting data received from the first deframer to a high speed to match a reception signal with a first femtocell; and a second reception signal matching unit converting data received from the first deframer to a high speed to match a reception signal with a second femtocell.

In one embodiment, the first femtocell and the first transmission signal matching unit may match in a baseband signal, and the second femtocell and the second transmission signal matching unit may match in a baseband signal.

In one embodiment, the first femtocell and the first reception signal matching unit may match in a baseband signal, and the second femtocell and the second reception signal matching unit may match in a baseband signal.

In one embodiment, low-speed conversion of the data may use puncturing.

In one embodiment, high-speed conversion of the data may use interpolation.

Other embodiments of the present invention provide a remote signal transmission/reception device including a remote signal transmission/reception device control unit monitoring and controlling a state of the remote signal transmission/reception device; a second deframer receiving a signal from the signal distribution device to supply the signal to a radio frequency (RF) transmission unit and to the remote signal transmission/reception device control unit; the RF transmission unit converting a signal from the second deframer to a high speed to RF-transmit the converted signal to the terminal; an RF reception unit RF-receiving the terminal signal to convert the received signal to a low speed; and a second framer generating a signal from the RF reception signal and a signal from the remote signal transmission/reception device control unit as a single frame to transmit the frame to a signal distribution device, wherein the RF transmission unit simultaneously transmits two different frequencies and the RF reception unit simultaneously receives two different frequencies.

Other embodiments of the present invention provide a multi-UTP femto distribution/relay device including a multiple femtocell signal reception step of receiving, by a signal distribution device, multiple femtocells; a transmission speed low-speed conversion step of converting transmission speeds of multiple femtocell signals received from the signal distribution device, to a low speed capable of transmitting to an UTP transmission line; a transmission speed high-speed conversion step of converting the multiple femtocell signals converted to the low speed, to a high speed by a remote signal transmission/reception device where a terminal is located, through the UTP transmission line; a multiple femtocell signal transmission step of wirelessly transmitting the femtocell signal converted to the high speed by the remote signal transmission/reception device; a multiple terminal signal reception step of wirelessly receiving a signal transmitted to the femtocell by a terminal that wirelessly receives the femtocell signal; a transmission speed low-speed conversion step of converting transmission speeds of multiple femtocell signals received from the remote signal transmission/reception device, to a low speed capable of transmitting to the UTP transmission line; a transmission speed high-speed conversion step of converting a signal converted to the low speed by the remote signal transmission/reception device, to a high speed by the signal distribution device where the femtocell is located, through the UTP transmission line; and a multiple terminal signal transmission step of transmitting, to the femtocell, the terminal signal converted to the high speed by the signal distribution device.

In one embodiment, the femtocell may be replaced with a microcell or picocell.

Advantageous Effects

The multi-UTP femto distribution/relay device according to the present invention has an advantage in that it is possible to combine two or more femtocells into a single signal, transmit the signal to the UTP cable and wirelessly transmit and receive the signal with a terminal remotely.

The multi-UTP femto distribution/relay device according to the present invention has also an effect in that it is possible to transmit two or more LTE multiple input multiple outputs (LTE MIMO) at a transmission speed lower than or equal to 1 Gbps without an impact on LTE communication quality by using an UTP line.

MODE FOR CARRYING OUT THE INVENTION

In the following, exemplary embodiments of the present invention are described with reference to the accompanying drawings.

Figure 1:
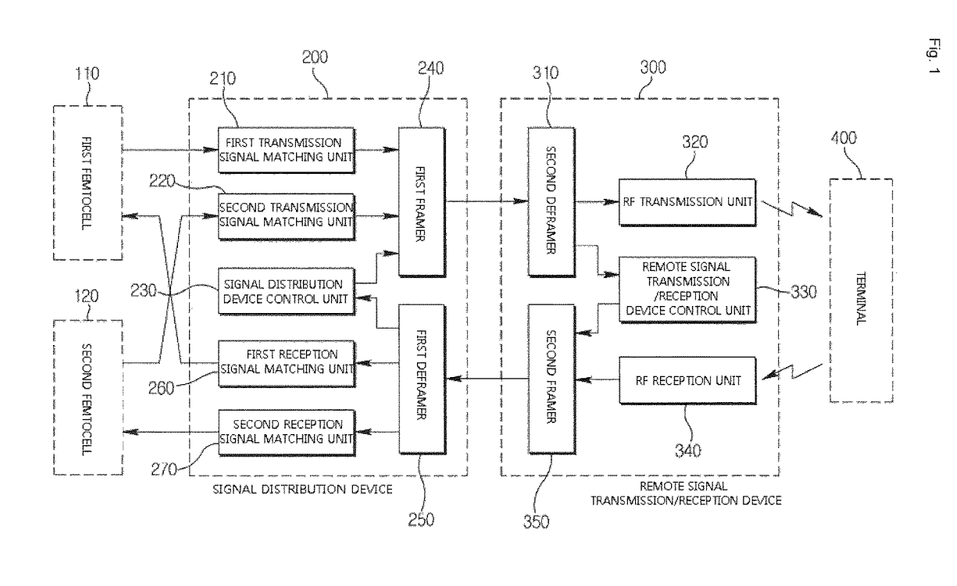
FIG. 1 is a detailed block diagram of a multiple unshielded twisted pair (UTP) femtocell distribution/relay device according to an embodiment of the present invention.

FIG. 1 is a detailed block diagram of a multiple unshielded twisted pair (UTP) femto distribution/relay device according to an embodiment of the present invention.

As shown in FIG. 1, the multi-UTP femto distribution/relay device includes a signal distribution device 200 that matches a signal with a first femtocell 110 and a second femtocell 120 by using a wire, and a remote signal transmission/reception device 300 that matches a signal with a terminal 400 wirelessly.

The signal distribution device 200 includes a first transmission signal matching unit 210 that matches a transmission signal from the first femtocell 100, a second transmission signal matching unit 220 that matches a transmission signal from the second femtocell 120, a signal distribution device control unit 230 that controls the signal distribution device 200, a first framer 240 that multiplexes a plurality of signals to generate a signal frame signal, a first deframer 250 that de-multiplexes a signal received through the remote signal transmission/reception device 300 to divide into multiple signals, a first reception signal matching unit 260 that matches a signal received from the terminal 400 through the remote signal transmission/reception device 300 with the first femtocell 110, and a second reception signal matching unit 270 that matches a signal received from the terminal 400 through the remote signal transmission/reception device 300 with the second femtocell 120.

The first transmission signal matching unit 210 matches a transmission signal from the first femtocell 110 and namely, it matches in a baseband signal. The first femtocell 110 typically outputs the baseband signal as an RF signal and it is thus inconvenient in that the signal distribution device 200 needs to convert the RF signal into the baseband signal.

Thus, in order to eliminate the inconveniency, the first femtocell 110 and the first transmission signal matching unit 210 may match in a baseband.

The second transmission signal matching unit 220 matches a transmission signal from the second femtocell 120 and namely, the second transmission signal matching unit may match with the second femtocell 120 in a baseband like the first transmission signal matching unit 210. In this case, since the baseband signals of the first transmission signal matching unit 210 and the second transmission signal matching unit 220 are the same, the first transmission signal matching unit 210 and the second transmission signal matching unit 220 may have the same structure.

The signal distribution device control unit 230 controls the signal distribution device 200 so that it monitors or controls various states of the signal distribution device 200 to provide related information to the remote signal transmission/reception device 300 or receive various states and control information on the remote signal transmission/reception device 300.

The first framer 240 multiplexes a plurality of signals to generate a single frame signal, and namely, it generates signals from the first transmission signal matching unit 210, the second transmission signal matching unit 220, and the signal distribution device control unit 230 as a single frame to transmit it to the remote signal transmission/reception device 300. In this case, the transmission speed of a frame may be slower than 1 Gbps in order not to exceed the transmission limit of an UTP line, a transmission cable between the signal distribution device 200 and the remote signal transmission/reception device 300.

The first deframer 250 demultiplexes a frame signal to divide it into multiple signals and namely, it divides and transmits the signal transmitted from the remote signal transmission/reception device 300 into the signal distribution device control unit 230, the first reception signal matching unit 260, and the second reception signal matching unit 270.

The first reception signal matching unit 260 matches the signal received from the terminal 400 through the remote signal transmission/reception device 300 with the first femtocell 100 and may match in a baseband for efficient matching. The type of the terminal 400 is identified by the remote signal transmission/reception device 300 and only a signal to match with the first femtocell 110 is transmitted to the first reception signal matching unit 260.

The second reception signal matching unit 270 matches the signal received from the terminal 400 through the remote signal transmission/reception device 300 with the second femtocell 120 and receives only a signal to match with the second femtocell 120 from the first deframer 250, like the first reception signal matching unit 260. Also, the second reception signal matching unit 270 may also match with the second femtocell 120 in a baseband for efficient matching.

The remote signal transmission/reception device 300 includes a second deframer 310 that matches and deframes a frame signal received from the signal distribution device 200, an RF transmission unit 320 that receives a signal from the second deframer 310, converts the received signal into RF and matches a signal with the terminal 400 wirelessly, a remote signal transmission/reception device control unit 330 that controls the remote signal transmission/reception device 300, an RF reception unit 340 that matches the signal with the terminal 400 wirelessly to convert an RF signal into a digital signal, and a second deframer 350 that generates a signal from the remote signal transmission/reception device control unit 330 and a signal from the RF reception unit 340 as a single frame signal to transmit the frame signal to the signal distribution device 200.

The second deframer 310 matches and deframes the frame signal received from the signal distribution device 200 to provide a transmission signal to the RF transmission unit 320 and the remote signal transmission/reception device control unit 330.

The RF transmission unit 320 receives a signal from the second deframer 310, converts the signal into RF and matches a signal with the terminal 400 wirelessly and namely, it converts signals from the first femtocell 110 and the second femtocell 120 into different RF frequencies to match with the terminal 400 wirelessly.

The remote signal transmission/reception device control unit 330 controls the remote signal transmission/reception device 300 and namely, it monitors or controls various states of the RF transmission unit 320 and the RF reception unit 340 to provide related information to the signal distribution device 300 or receive various states and control information on the signal distribution device 300.

The RF reception unit 340 matches a signal with the terminal wirelessly to convert a transmission signal from the terminal 400 into a digital signal and namely, it determines which of the first femtocell 110 and the second femtocell 120 is used for matching according to the operating frequency of the terminal 400 and converts into a baseband.

The second framer 350 generates a signal from the remote signal transmission/reception device control unit 330 and a signal from the RF reception unit 340 as a single frame signal to transmit the frame signal to the signal distribution device 200 and the transmission speed may be slower than 1 Gbps in order not to exceed the transmission limit of an UTP line, a transmission line.

MODE FOR CARRYING OUT THE INVENTION

Figure 2:
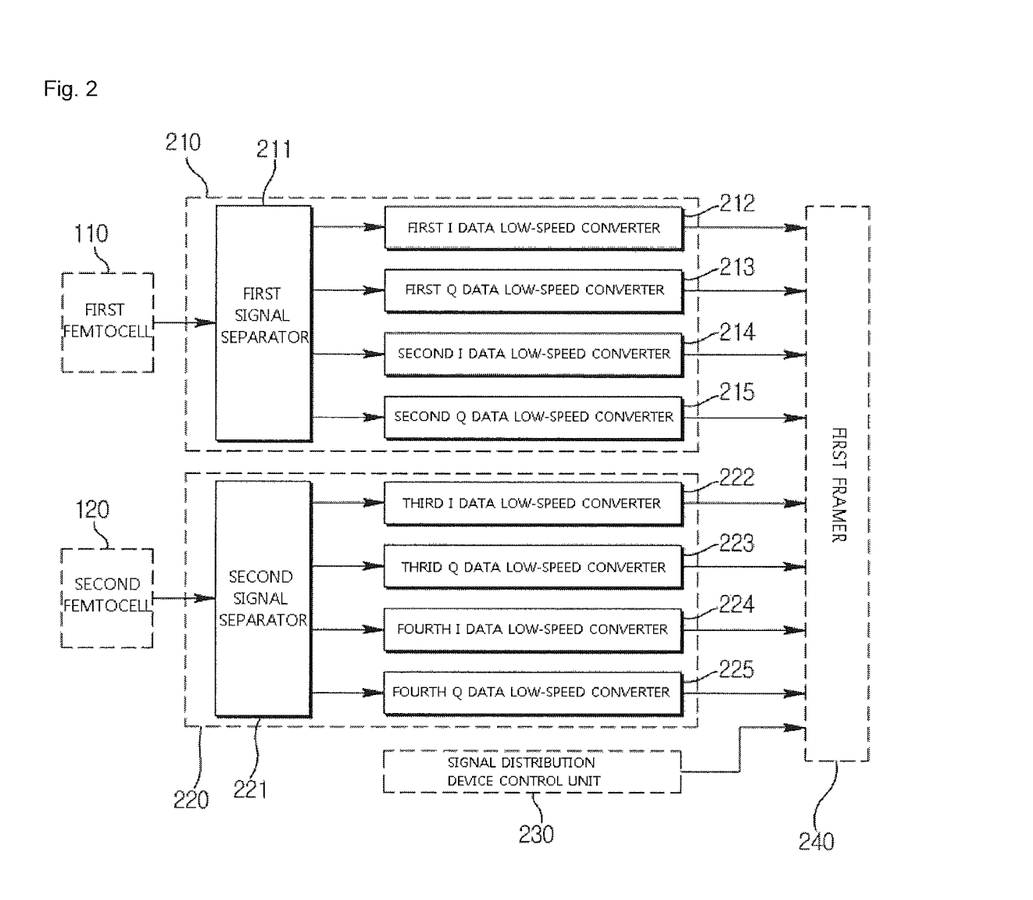
FIG. 2 is a detailed block diagram of a first transmission signal matching unit and a second transmission signal matching unit in FIG. 1.

FIG. 2 is a detailed block diagram of the first transmission signal matching unit 210 and the second transmission signal matching unit 220 in FIG. 1.

As shown in FIG. 2, the first transmission signal matching unit 210 includes a first signal divider 211 that divides a signal from the first femtocell 110, a first I data low-speed converter 212 that converts, to a low speed, I data for a first multiple-input multiple-output (MIMO) antenna among signals from the first femtocell 110, a first Q data low-speed converter 213 that converts, to a low speed, Q data for the first MIMO antenna, a second I data low-speed converter 214 that converts, to a low speed, I data for a second MIMO antenna, and a second Q data low-speed converter 215 that converts, to a low speed, Q data for the second MIMO antenna.

Firstly, the first signal divider 211 divides a signal from the first femtocell 110 and namely, it matches as a baseband with the first femtocell 110 and simultaneously matches fourth pieces of data, such as the I data for the first MIMO antenna, the Q data for the first MIMO antenna, the I data for the second MIMO antenna, and the Q data for the second MIMO antenna. In this case, a transmission speed T_femto_1 matching with the first femtocell 110 is a value obtained by multiplying a default sampling transmission speed (15.36 Msps), the number of bits (12 bits) used for digital to analog (DA) conversion, and the number of pieces of data (4) as follows:

$$T\_femto\_1 = 15.36 \text{ Msps} * 12 \text{ bits} * 4 = 737.28 \text{ Mbps}$$

The first I data low-speed converter 212 converts, to a low speed, the I data for the first MIMO antenna among signals from the first femtocell 110 and namely, it converts the default sampling transmission speed of the first femtocell 110, 15.36 Msps to 10 Msps. It is possible to use a puncturing technique that removes some of data for the low-speed conversion of a signal and there is a need to minimize out of emission of an operating frequency when converting into RF later. When there is frequent puncturing, out of emission may occur and there is a problem in that inter-data interference occurs and thus an appropriate level of puncturing is required.

Likewise, the first Q data low-speed converter 213, the second I data low-speed converter 214, and the second Q data low-speed converter 215 also convert the default sampling transmission speed of the first femtocell 110, 15.36 Msps to 10 Msps.

The second transmission signal matching unit 220 includes a second signal divider 221 that divides a signal from the second femtocell 120, a third I data low-speed converter 222 that converts, to a low speed, I data for a first MIMO antenna among signals from the second femtocell 120, a third Q data low-speed converter 223 that converts, to a low speed, Q data for the first MIMO antenna, a fourth I data low-speed converter 224 that converts, to a low speed, I data for a second MIMO antenna, and a fourth Q data low-speed converter 225 that converts, to a low speed, Q data for the second MIMO antenna.

Firstly, the second signal divider 211 divides a signal from the second femtocell 120 like the first signal divider 211 and namely, it matches as a baseband with the second femtocell 120 and simultaneously matches fourth pieces of data, such as the I data for the first MIMO antenna, the Q data for the first MIMO antenna, the I data for the second MIMO antenna, and the Q data for the second MIMO antenna. In this case, a transmission speed T_femto_2 matching with the second femtocell 120 is a value obtained by multiplying a default sampling transmission speed (15.36 Msps), the number of bits (12 bits) used for DA conversion, and the number of pieces of data (4) as follows:

$$T\_femto\_2 = 15.36 \text{ Msps} * 12 \text{ Bits} * 4 = 737.28 \text{ Mbps}$$

The third I data low-speed converter 222 converts, to a low speed, the I data for the first MIMO antenna among signals from the second femtocell 120 and namely, it converts the default sampling transmission speed of the second femtocell 120, 15.36 Msps to 10 Msps. It is possible to use a puncturing technique that removes some of data for the low-speed conversion of a signal like the first I data low-speed converter 212 and there is a need to minimize out of emission of an operating frequency when converting into RF later. When there is frequent puncturing, out of emission may occur and there is a problem in that inter-data interference occurs and thus an appropriate level of puncturing is required.

Likewise, the third Q data low-speed converter 223, the fourth I data low-speed converter 224, and the fourth Q data low-speed converter 225 also convert the default sampling transmission speed of the second femtocell 120, 15.36 Msps to 10 Msps.

Thus, a signal used to generate a frame signal in the first framer 240 includes a total of 960 Mbps including 120 Mbps converted in consideration of the number of bits (12 bits) used for DA in the first I data low-speed converter 212, 120 Mbps converted in the first Q data low-speed converter 213 in the same way, 120 Mbps converted in the second I data low-speed converter 214, 120 Mbps converted in the second Q data low-speed converter 215, 120 Mbps converted in the third I data low-speed converter 222, 120 Mbps converted in the third Q data low-speed converter 223, 120 Mbps converted in the fourth I data low-speed converter 224, and 120 Mbps converted in the fourth Q data low-speed converter 225, and 40 Mbps for transmitting state and control information in the signal distribution device control unit 230.

Therefore, the transmission speed T_framer_1 of data generated as a frame in the first framer 240 is a value obtained by summing 8*120 Mbps generated in eight data low-speed converters 212 to 215 and 222 to 225 and 40 Mbps transmitted by the signal distribution device control unit 230, as follows:

$$T\text{framer}\_1 = 120 \text{ Mbps} * 8 + 40 \text{ Mbps} = 1 \text{ Gbps}.$$

The transmission speed generated in the first framer 240 may transmit to an UTP cable connected to between the signal distribution device 200 and the remote signal transmission/reception device 300. Also, data transmitted to the UTP cable has an advantage in that it is possible to transmit data from MIMO femtocells 110 and 120 that use two frequency bands in different manners.

Thus, a relay device that uses a typical UTP cable may match only a MIMO femtocell that uses two antennas due to the limit of the data transmission capacity of the UTP cable but according to the present invention, it is possible to match two MIMO femtocells that use two antennas and thus it is possible to increase the transmission capacity of a relay device.

For example, frequencies for mobile communication for domestic mobile communication companies are divided into 850 MHz band and 1.8 GHz band. In order to serve two frequency bands, two femtocells 110 and 120 are typically used and there is a need to install each relay device for each femtocell but according to the present invention, it is possible to enable an efficient relay device and facility by simultaneously relaying two femtocells 110 and 120.

Figure 3:
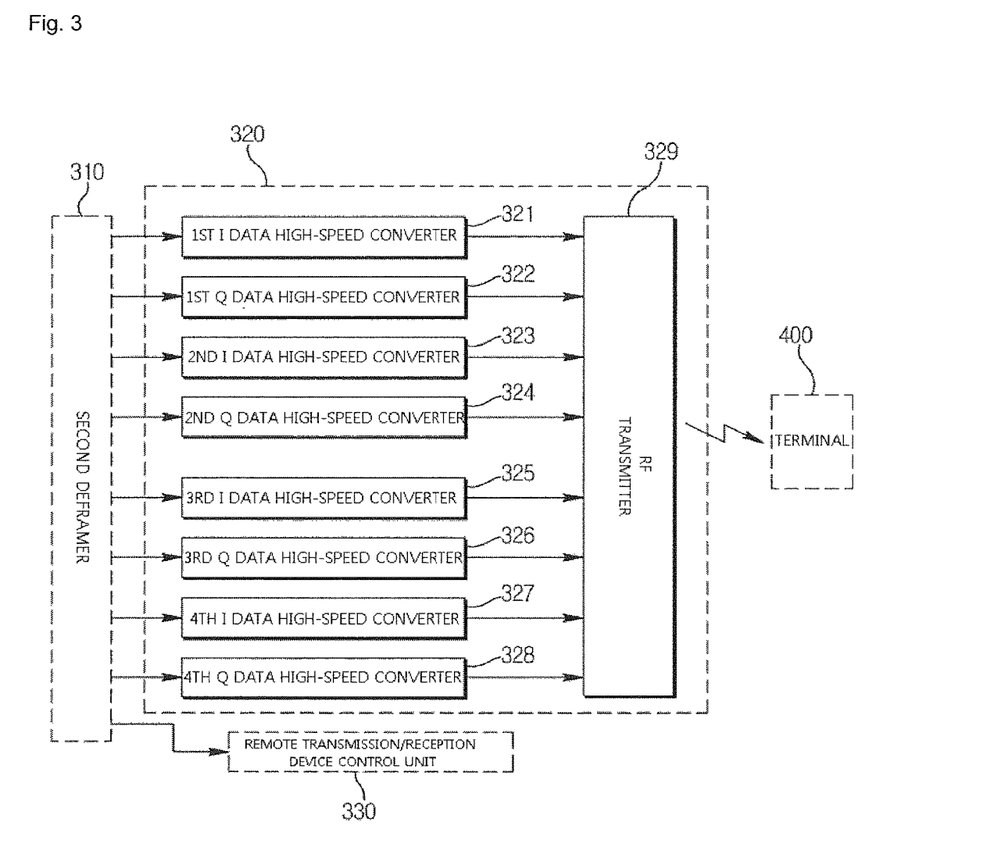
FIG. 3 is a detailed block diagram of a radio frequency (RF) transmission unit in FIG. 1.

FIG. 3 is a detailed block diagram of the RF transmission unit 320 in FIG. 1.

As shown in FIG. 3, the RF transmission unit 320 includes a first I data high-speed converter 321 that converts, to a high speed, I data for a first antenna among pieces of MIMO data from the first femtocell 110 received from the second deframer 310, a first Q data high-speed converter 322 that converts, to a high speed, Q data for the first antenna among pieces of MIMO data from the first femtocell 110, a second I data high-speed converter 323 that converts, to a high speed, I data for a second antenna among pieces of MIMO data from the first femtocell 110, a second Q data high-speed converter 324 that converts, to a high speed, Q data for the second antenna among pieces of MIMO data from the first femtocell 110, a third I data high-speed converter 325 that converts, to a high speed, I data for a first antenna among pieces of MIMO data from the second femtocell 120, a third Q data high-speed converter 328 that converts, to a high speed, Q data for the first antenna among pieces of MIMO data from the second femtocell 120, a fourth I data high-speed converter 327 that converts, to a high speed, I data for a second antenna among pieces of MIMO data from the second femtocell 120, a fourth Q data high-speed converter 328 that converts, to a high speed, Q data for the second antenna among pieces of MIMO data from the second femtocell 120, and an RF transmitter 329 that converts a baseband signal into RF.

The first I data high-speed converter 321 converts, to the high speed, the I data for the first antenna among pieces of MIMO data from the first femtocell 110 and namely, it receives only 120 Mbps among 1 Gbps received from the second deframer 310 and converts the 120 Mbps transmission data into 184.32 Mbps by using an interpolation technique that is a data adding technique. That is, it converts 10 Msps*12 bits into 15.36 Msps*12 bits to restore the signal to data provided by the femtocells 110 and 120.

Likewise, the first Q data high-speed converter 322, the second I data high-speed converter 323, the second Q data high-speed converter 324, the third I data high-speed converter 325, the third Q data high-speed converter 328, the fourth I data high-speed converter 327, and the fourth Q data high-speed converter 328 also convert 120 Mbps transmission data into 184.32 Mbps data by the interpolation technique.

The RF transmitter 329 converts a baseband signal into an RF signal and namely, it converts baseband signals 321 to 324 provided from the first femtocell 110 into RF used in the first femtocell 110, convert baseband signals 325 to 328 provided from the second femtocell 120 into RF used in the second femtocell 120, and connects wirelessly to the terminal 400.

The remote signal transmission/reception device control unit 330 monitors and controls the state of the remote signal transmission/reception device 300 and is simultaneously assigned 40 Mbps from the second deframer 310 to receive various state and control signals received from the signal distribution device 200.

Figure 4:
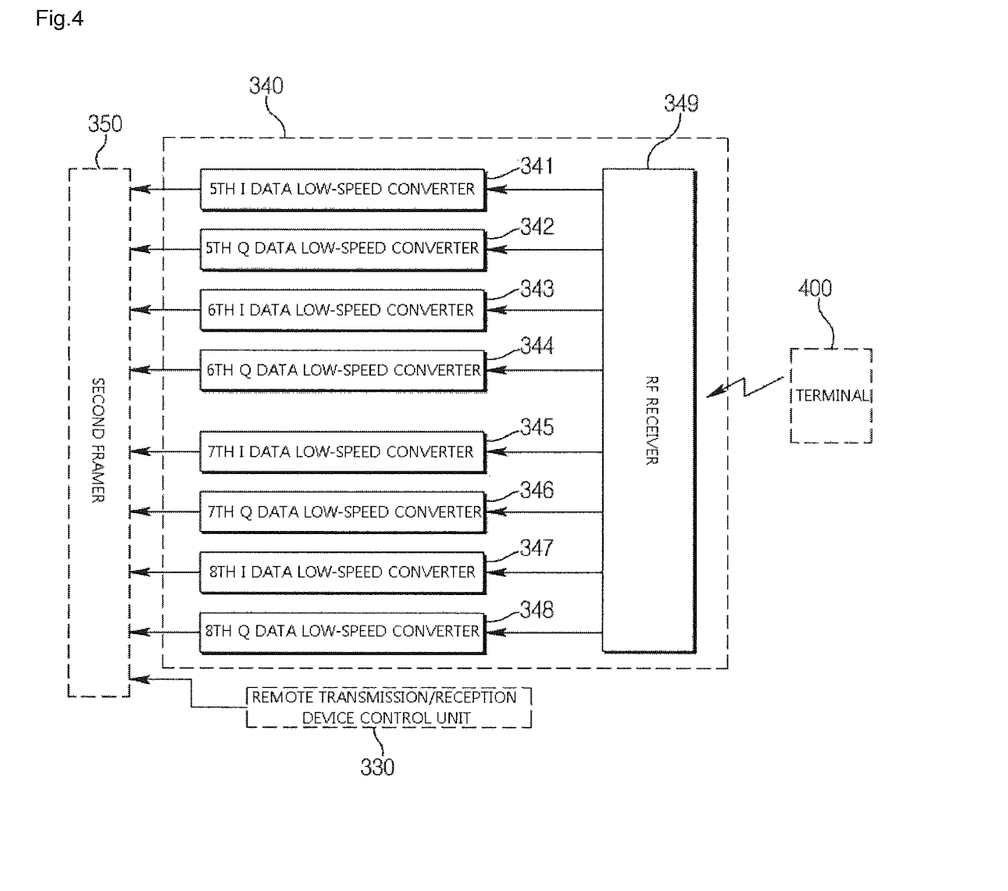
FIG. 4 is a detailed block diagram of an RF reception unit in FIG. 1.

FIG. 4 is a detailed block diagram of the RF reception unit 340 in FIG. 1.

As shown in FIG. 4, the RF reception unit 340 includes an RF receiver 349 that converts an RF signal into a baseband signal, a fifth I data low-speed converter 341 that converts, to a low speed, I data for a first antenna among pieces of MIMO data capable of being received from the first femtocell 110, a fifth Q data low-speed converter 342 that converts, to a low speed, Q data for the first antenna among pieces of MIMO data capable of being received from the first femtocell 110, a sixth I data low-speed converter 343 that converts, to a low speed, I data for a second antenna among pieces of MIMO data capable of being received from the first femtocell 110, a sixth Q data low-speed converter 344 that converts, to a low speed, Q data for the second antenna among pieces of MIMO data capable of being received from the first femtocell 110, a seventh I data low-speed converter 345 that converts, to a low speed, I data for a first antenna among pieces of MIMO data capable of being received from the second femtocell 120, a seventh Q data low-speed converter 346 that converts, to a low speed, Q data for the first antenna among pieces of MIMO data capable of being received from the second femtocell 120, an eighth I data low-speed converter 347 that converts, to a low speed, I data for a second antenna among pieces of MIMO data capable of being received from the second femtocell 120, and an eighth Q data low-speed converter 348 that converts, to a low speed, Q data for the second antenna among pieces of MIMO data capable of being received from the second femtocell 120.

The RF receiver 349 converts an RF signal into a baseband signal and namely, it identifies a frequency used by the terminal 400 and a corresponding femtocell 110 or 120 to convert the frequency into a baseband signal. The RF receiver 349 employs MIMO and receives with two antennas, each of which an I baseband converter and a Q baseband converter that have two different frequencies. The baseband converter uses an AD converter that has a sampling speed of 15.36 Msps and a resolution of 12 bits, and thus has a transmission speed of 184.32 Mbps.

The fifth I data low-speed converter 341 converts, to a low speed, I data for a first antenna among pieces of MIMO data capable of being received from the first femtocell 110 and namely, it converts a 184.32 Mbps signal provided from the RF receiver 349 into 120 Mbps through puncturing.

Likewise, the fifth Q data low-speed converter 342, the sixth I data low-speed converter 343, the sixth Q data low-speed converter 344, the seventh I data low-speed converter 345, the seventh Q data low-speed converter 346, the eighth I data low-speed converter 347, and the eighth Q data low-speed converter 348 also convert a 184.32 Mbps signal provided from the RF receiver 349 into 120 Mbps through puncturing.

The remote signal transmission/reception device control unit 330 monitors and controls the state of the remote signal transmission/reception device 300 and namely, it connects to the second deframer 350 at a data rate of 40 Mbps in order to transmit state information and control signals on the remote signal transmission/reception device 300 to the signal distribution device 200.

Thus, it generates eight pieces of data received from the data low-speed converters 341 to 348 and a transmission speed to be transmitted by the remote signal transmission/reception device control unit 330 as a single frame to transmit the frame and the transmission speed T_framer_2 of data transmitted by the second framer 350 is as follows:

$$T\_framer\_2 = 120 \text{ Mbps} * 8 + 40 \text{ Mbps} = 1 \text{ Gbps}.$$

Therefore, the transmission speed T_framer2 of the data transmitted by the second framer 350 may transmit to an UTP cable connected to between the signal distribution device 200 and the remote signal transmission/reception device 300, like the transmission speed T_framer1 generated by the first framer 240. That is, data transmitted to the UTP cable is characterized in that it transmits data from MIMO femtocells 110 and 120 that use two frequency bands in different manners.

Figure 5:
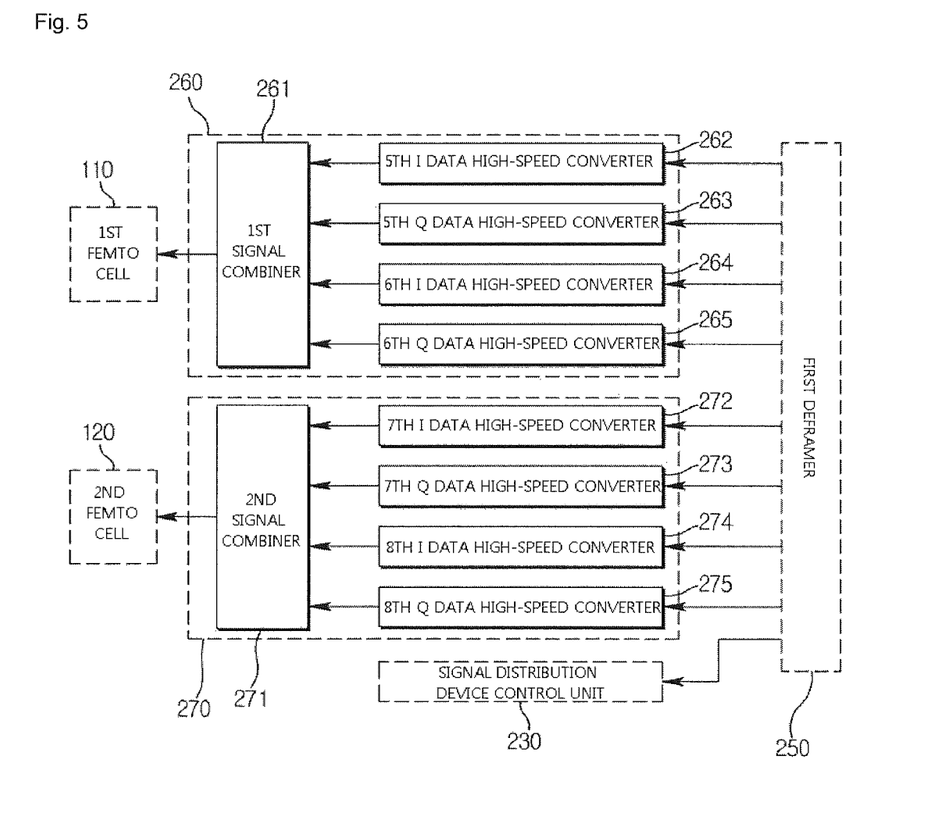
FIG. 5 is a detailed block diagram of a first reception signal matching unit and a second reception signal matching unit in FIG. 1.

FIG. 5 is a detailed block diagram of the first reception signal matching unit 260 and the second reception signal matching unit 270 in FIG. 1.

As shown in FIG. 5, the first reception signal matching unit 260 includes a fifth I data high-speed converter 262 that converts, to a high speed, I data for a first antenna among pieces of MIMO data for the first femtocell 110 received from the first deframer 250, a fifth Q data high-speed converter 263 that converts, to a high speed, Q data for the first antenna among pieces of MIMO data for the first femtocell 110, a sixth I data high-speed converter 264 that converts, to a high speed, I data for a second antenna among pieces of MIMO data for the first femtocell 110, a sixth Q data high-speed converter 265 that converts, to a high speed, Q data for the second antenna among pieces of MIMO data for the first femtocell 110, and a first signal combiner 261 that combines the outputs of the data high-speed converters 262 to 265 into a single signal.

The fifth I data high-speed converter 262 converts, to the high speed, the I data for the first antenna among pieces of MIMO data for the first femtocell 110 received from the first deframer 250 and namely, it receives only 120 Mbps among 1 Gbps received from the first deframer 250 and converts the 120 Mbps transmission data into 184.32 Mbps by using an interpolation technique. That is, it converts 10 Msps*12 bits into 15.36 Msps*12 bits to restore the signal to data provided by the terminal 400.

Likewise, the fifth Q data high-speed converter 263, the sixth I data high-speed converter 264, and the sixth Q data high-speed converter 265 also convert 120 Mbps transmission data into 184.32 Mbps by the interpolation technique.

The first signal combiner 261 combines the outputs of the data high-speed converters 262 to 265 into a single signal and transmits at 737.28 Mbps that is the same as the transmission speed T_femto_1 matching with the first femtocell 110.

The second reception signal matching unit 270 includes a seventh I data high-speed converter 272 that converts, to a high speed, I data for a first antenna among pieces of MIMO data for the second femtocell 120 received from the first deframer 250, a seventh Q data high-speed converter 273 that converts, to a high speed, Q data for the first antenna among pieces of MIMO data for the second femtocell 120, an eighth I data high-speed converter 274 that converts, to a high speed, I data for a second antenna among pieces of MIMO data for the second femtocell 120, an eighth Q data high-speed converter 275 that converts, to a high speed, Q data for the second antenna among pieces of MIMO data for the second femtocell 120, and a second signal combiner 271 that combines the outputs of the data high-speed converters 272 to 275 into a single signal.

The seventh I data high-speed converter 272 converts, to the high speed, the I data for the first antenna among pieces of MIMO data for the second femtocell 120 received from the first deframer 250 and namely, it receives only 120 Mbps among 1 Gbps received from the first deframer 250 and converts the 120 Mbps transmission data into 184.32 Mbps by using an interpolation technique. That is, it converts 10 Msps*12 bits into 15.36 Msps*12 bits to restore the signal to data provided by the terminal 400.

Likewise, the seventh Q data high-speed converter 273, the eighth I data high-speed converter 274, and the eighth Q data high-speed converter 275 also convert 120 Mbps transmission data into 184.32 Mbps by the interpolation technique.

The second signal combiner 271 combines the outputs of the data high-speed converters 272 to 275 into a single signal and transmits at 737.28 Mbps that is the same as the transmission speed T_femto_2 matching with the second femtocell 120.

Figure 6:
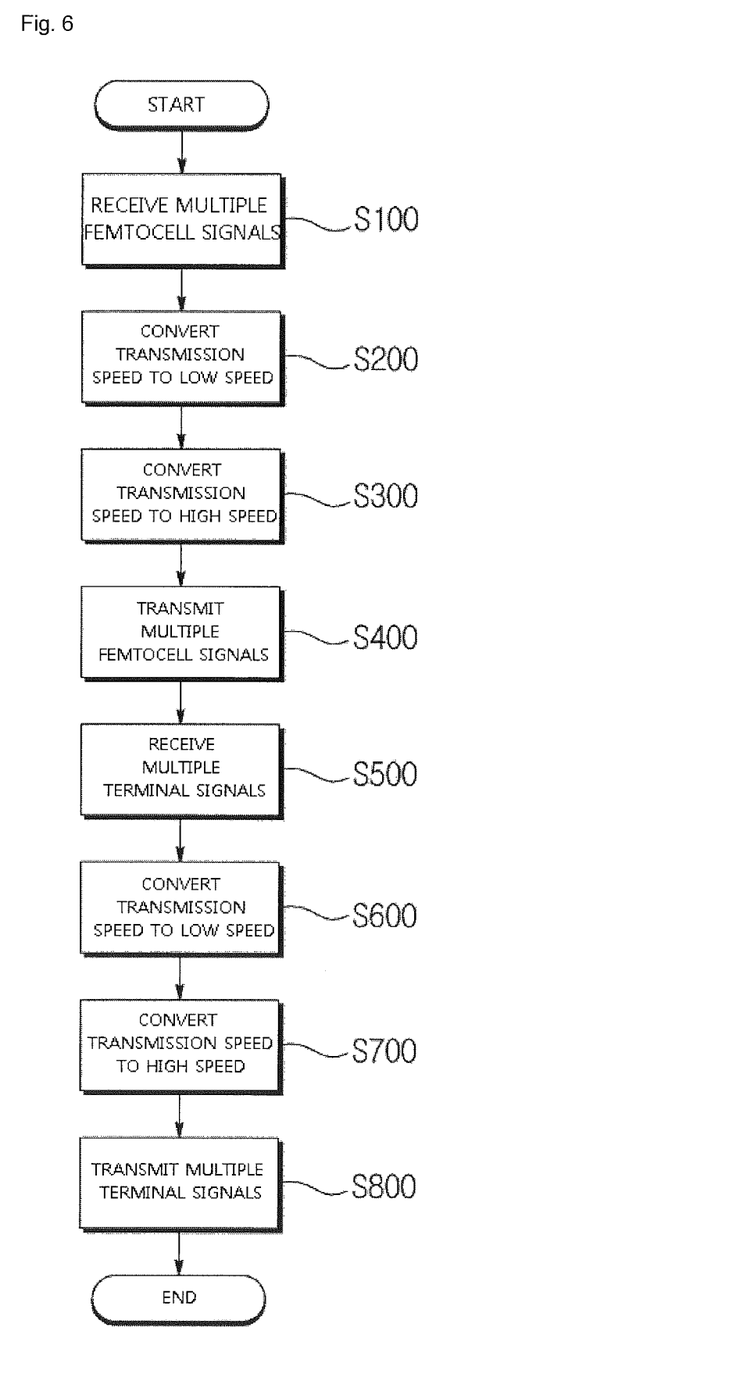
FIG. 6 is a detailed flow chart of a multi-UTP femto distribution/relay method according to an embodiment of the present invention.

FIG. 6 is a detailed flow chart of a multiple femto distribution/relay method according to an embodiment of the present invention.

As shown in FIG. 6, the multiple femto distribution/relay method includes a multiple femtocell signal reception step S100 of receiving, by the signal distribution device 200, multiple femtocells 110 and 120, a transmission speed low-speed conversion step S200 of converting transmission speeds of multiple femtocell signals received from the signal distribution device 200, to a low speed capable of transmitting to a unshielded twisted pair (UTP) transmission line, a transmission speed high-speed conversion step S300 of converting the multiple femtocell signals converted to the low speed, to a high speed by the remote signal transmission/reception device 300 where a terminal is located, through the UTP transmission line, a multiple femtocell signal transmission step S400 of wirelessly transmitting the femtocell signal converted to the high speed by the remote signal transmission/reception device 300, a multiple terminal signal reception step S500 of wirelessly receiving a signal transmitted to a femtocell by the terminal 400 that wirelessly receives a femtocell signal, a transmission speed low-speed conversion step S600 of converting a transmission speed of a terminal signal received by the remote signal transmission/reception device 300, to a low speed capable of transmitting to an UTP transmission line, a transmission speed high-speed conversion step S700 of converting a signal converted to the low speed by the remote signal transmission/reception device 300, to a high speed by the signal distribution device 200 where the femtocells 110 and 120 are located, through the UTP transmission line, and a multiple terminal signal transmission step S800 of transmitting a terminal signal converted to the high speed by the signal distribution device 200 to the femtocells 110 and 120.

The multiple femtocell signal reception step S100 receives multiple femtocells 110 and 120 by the signal distribution device 200, and namely, it simultaneously matches the first femtocell 110 and the second femtocell 120 that use different frequencies, in a baseband.

The transmission speed low-speed conversion step S200 converts the transmission speeds of multiple femtocell signals received from the signal distribution device 200, to a low speed capable of transmitting to an UTP transmission cable and namely, it converts a signal into a signal slower than 1 Gbps that is the maximum speed at which the UTP may transmit.

The transmission speed high-speed conversion step S300 converts the multiple femtocell signals converted to the low speed, to a high speed by the remote signal transmission/reception device 300 where a terminal is located, through the UTP transmission line, and namely it converts to be the same transmission speed as that received from the femtocells 110 and 120.

The multiple femtocell signal transmission step S400 wirelessly transmits the femtocell signal converted to the high speed by the remote signal transmission/reception device 300 and the signal is amplified by the RF transmission unit 320 and wirelessly transmitted through an antenna (not shown).

The multiple terminal signal reception step S500 wirelessly receives a signal transmitted to a femtocell by the terminal 400 that wirelessly receives a femtocell signal and the terminal communicates with the first femtocell 110 or the second femtocell 120.

The transmission speed low-speed conversion step S600 converts a transmission speed of a terminal signal received by the remote signal transmission/reception device 300, to a low speed capable of transmitting to an UTP transmission cable and namely, it converts a signal into a signal slower than 1 Gbps that is the maximum speed at which the UTP may transmit, like the transmission speed high-speed conversion step S300.

The transmission speed high-speed conversion step S700 of converts a signal converted to the low speed by the remote signal transmission/reception device 300, to a high speed by the signal distribution device 200 where the femtocells 110 and 120 are located, through the UTP transmission line, and namely it converts to be the same transmission speed as that received from the terminal 400.

The multiple terminal signal transmission step S800 transmits a terminal signal converted to the high speed by the signal distribution device 200 to the femtocells 110 and 120 and matches in a baseband simultaneously.

Figure 7:
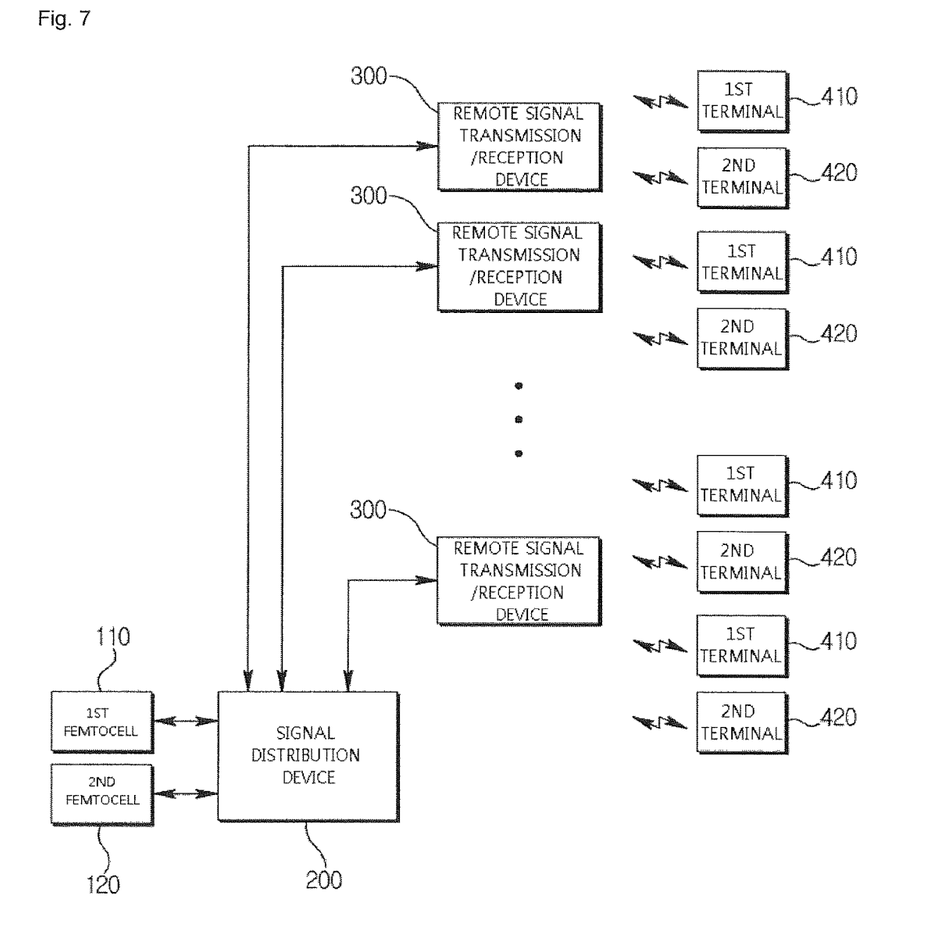
FIG. 7 is a conceptual view of the use of FIG. 1.

FIG. 7 is a conceptual view of the use of FIG. 1.

As shown in FIG. 7, two or more femtocells 110 and 120 match with a single signal distribution device. 200, which is connected to a plurality of remote signal transmission/reception devices 300 through an UTP, in which case a first terminal 410 served by the first femtocell 110 and a second terminal 420 served by the second femtocell 120 are wirelessly connected to a single remote signal transmission/reception device 300.

The first femtocell 110 and the second femtocell 120 use different RF frequencies and match with the signal distribution device 200 in a baseband for efficient matching. The signal distribution device 200 matches the first femtocell 110 and the second femtocell 120 in a baseband and converts the transmission speed of the baseband to a low speed in order to increase the transmission efficiency of an UTP.

The UTP cable that connects the signal distribution device 200 and the remote signal transmission/reception device 300 is a single UTP line, is characterized in that it transmits first femtocell 110 and second femtocell 120 signals simultaneously, and may transmit at a speed slower than or equal to 1 Gbps that is the transmission capacity limit of the UTP transmission line.

The remote signal transmission/reception device 300 restores a signal received from the signal distribution device 200 back to a high speed, converts a baseband signal into RF and wirelessly matches with the terminals 410 and 420. In this case, it is characterized in that the signal received from the first femtocell 110 is converted into an RF frequency used in the first femtocell 110 and the signal received from the second femtocell 120 is converted into an RF frequency used in the second femtocell 120.

That is, the signal received from the first femtocell 110 may wirelessly connect to the first terminal 410, and the signal received from the second femtocell 120 may wirelessly connected to the second terminal 420.

On the contrary, the signal transmitted by the first terminal 410 is converted into a baseband through the remote signal transmission/reception device 300, transmitted to the signal distribution device 200 along an UTP cable and received by the first femtocell 110. Likewise, it is characterized in that the signal transmitted by the second terminal 420 is converted into a baseband through the remote signal transmission/reception device 300, transmitted to the signal distribution device 200 along the UTP cable and received by the second femtocell 120.

As such, the multi-UTP femto distribution/relay device according to the present invention has an advantage in that a time delay is compensated for to be served by a plurality of remote signal transmission/reception devices simultaneously, and has an effect in that there is no impact on LTE communication quality by compensating for a time delay shorter than 100 μsec.

As such, the multi-UTP femto distribution/relay device according to the present invention has an advantage in that it is possible to combine two or more femtocells into a single signal, transmit the signal to the UTP cable and wirelessly transmit and receive the signal with a terminal remotely, and has also an effect in that it is possible to transmit two or more LTE MIMO at a transmission speed lower than or equal to 1 Gbps without an impact on LTE communication quality by using an UTP line.

Also, since a matching method between the femtocell 100 and the signal distribution device 200 may also be used for a macrocell or picocell matching method instead of the femtocell 100 without a change, the femtocell 100 may also be applied to the macrocell and the picocell without a limitation to the femtocell 100.

INDUSTRIAL APPLICABILITY

The present invention may be used for a multi-UTP femto distribution/relay device that distributes and relays a signal for two or more femtocell signals to several antennas by using an unshielded twist pair (UTP) line.

What is claimed is:

1. A signal distribution device comprising:
    a signal distribution device control circuit monitoring and controlling a state of a signal distribution device;
    a first transmission signal matching circuit matching a transmission signal from a first femtocell to convert a data transmission speed to a low speed;
    a second transmission signal matching circuit matching a transmission signal from a second femtocell to convert a data transmission speed to a low speed;
    a first framer combining an output from the first transmission signal matching circuit, an output from the second transmission signal matching circuit, and an output from the signal distribution device, into a single signal to transmit the single signal to a remote signal transmission-reception device;
    a first deframer receiving and deframing a terminal signal from the remote signal transmission-reception device to transmit data to the first reception signal matching circuit, to the second reception signal matching circuit, and to the signal distribution device control circuit;
    a first reception signal matching circuit converting the data received from the first deframer to a high speed to match a reception signal with a first femtocell; and
    a second reception signal matching circuit converting the data received from the first deframer to a high speed to match a reception signal with a second femtocell.

2. The signal distribution device of claim 1, where the first femtocell and the first transmission signal matching circuit match in a baseband signal, and the second femtocell and the second transmission signal matching circuit match in a baseband signal.

3. The signal distribution device of claim 1, where the first femtocell and the first reception signal matching circuit match in a baseband signal, and the second femtocell and the second reception signal matching circuit match in a baseband signal.

4. The signal distribution device of claim 1, wherein low-speed conversion of the data uses puncturing.

5. The signal distribution device of claim 1, wherein high-speed conversion of the data uses interpolation.

6. The signal distribution device of claim 1, wherein the femtocell is replaced with a microcell or picocell.

7. A remote signal transmission-reception device comprising:
    a remote signal transmission-reception device control circuit monitoring and controlling a state of the remote signal transmission-reception device;
    a second deframer receiving a signal from a signal distribution device to supply the signal to a radio frequency (RF) transmission unit and to the remote signal transmission-reception device control circuit;
    the RF transmission unit converting the signal from the second deframer to a high speed to RF-transmit the converted signal to a terminal;
    an RF reception unit RF-receiving a signal from the terminal to convert the received signal to a low speed; and
    a second framer generating a signal from the RF reception signal and a signal from the remote signal transmission-reception device control circuit as a single frame to transmit the frame to the signal distribution device,
    wherein the RF transmission unit simultaneously transmits two different frequencies and the RF reception unit simultaneously receives two different frequencies.

8. The remote signal transmission-reception device of claim 7, wherein low-speed conversion of data uses puncturing.

9. The remote signal transmission-reception device of claim 7, wherein high-speed conversion of data uses interpolation.

10. A multi-Unshielded Twist Pair (UTP) femto distribution-relay method comprising:
- a multiple femtocell signal reception step of receiving, by a signal distribution device, multiple femtocells;
- a transmission speed low-speed conversion step of converting transmission speeds of multiple femtocell signals received from the signal distribution device, to a low speed for transmitting to an UTP transmission line;
- a transmission speed high-speed conversion step of converting the multiple femtocell signals converted to the low speed, to a high speed by a remote signal transmission-reception device where a terminal is located, through the UTP transmission line;
- a multiple femtocell signal transmission step of wirelessly transmitting the femtocell signal converted to the high speed by the remote signal transmission-reception device;
- a multiple terminal signal reception step of wirelessly receiving a signal transmitted to the femtocell by the terminal that wirelessly receives the femtocell signal;
- a transmission speed low-speed conversion step of converting transmission speeds of multiple femtocell signals received from the remote signal transmission-reception device, to a low speed for transmitting to the UTP transmission line;
- a transmission speed high-speed conversion step of converting a signal converted to the low speed by the remote signal transmission-reception device, to a high speed by the signal distribution device where the femtocell is located, through the UTP transmission line; and
- a multiple terminal signal transmission step of transmitting, to the femtocell, the terminal signal converted to the high speed by the signal distribution device.

11. The multi-UTP femto distribution-relay method of claim 10, wherein the femtocell is replaced with a microcell or picocell.

* * * * *